United States Patent [19]
Yamamoto et al.

[11] Patent Number: 4,802,107
[45] Date of Patent: Jan. 31, 1989

[54] OFFSET DRIFT CORRECTION METHOD IN COLOR FILM INSPECTION APPARATUS

[75] Inventors: Shohei Yamamoto; Yukito Kato, both of Tokyo, Japan

[73] Assignee: Fuji Photo Film Co., Ltd., Kanagawa, Japan

[21] Appl. No.: 91,929

[22] Filed: Sep. 1, 1987

[30] Foreign Application Priority Data

Sep. 1, 1986 [JP] Japan .................................. 61-205703

[51] Int. Cl.$^4$ .......................... G02B 1/00; G03F 3/10; G01N 21/85; G03B 7/091
[52] U.S. Cl. .................................... 364/525; 364/526; 364/571.07; 358/76; 358/80; 356/408; 354/426
[58] Field of Search ............... 364/170, 188, 521, 525, 364/526, 571, 722; 358/76, 80; 356/408; 354/425, 426

[56] References Cited

U.S. PATENT DOCUMENTS

| | | | |
|---|---|---|---|
| 4,200,934 | 4/1980 | Hofmann | 364/525 |
| 4,364,084 | 12/1982 | Akimoto et al. | 358/76 |
| 4,402,015 | 8/1983 | Yamada | 358/80 X |
| 4,467,364 | 8/1984 | Konagaya | 358/80 X |
| 4,535,413 | 8/1985 | Shiota et al. | 364/526 |
| 4,536,848 | 8/1985 | d'Entremont et al. | 364/526 |
| 4,611,918 | 9/1986 | Nishida et al. | 364/526 |
| 4,646,252 | 2/1987 | Terashita | 364/525 |
| 4,666,307 | 5/1987 | Matsumoto et al. | 364/525 |
| 4,679,155 | 7/1987 | Mitsuka | 364/525 |
| 4,689,669 | 8/1987 | Hoshino et al. | 358/80 |
| 4,692,797 | 9/1987 | Matsumoto | 358/76 |
| 4,704,699 | 11/1987 | Farina et al. | 364/525 |
| 4,736,244 | 4/1988 | Shiota et al. | 358/80 X |
| 4,736,245 | 4/1988 | Seto et al. | 358/80 X |

FOREIGN PATENT DOCUMENTS

| | | | |
|---|---|---|---|
| 59-91324 | 5/1984 | Japan | 364/526 |
| 61-137029 | 6/1986 | Japan | 364/525 |

Primary Examiner—William L. Sikes
Assistant Examiner—Brian M. Healy
Attorney, Agent, or Firm—Sughrue, Mion, Zinn, Macpeak, and Seas

[57] ABSTRACT

An offset drift correction method for use in in a color film inspection apparatus includes the steps of; measuring the changes of various amounts of light at intervals of a predetermined amount of light as density signals by using a green standardized logarithmic-transforming curve; providing table data by shifting the green standardized logarithmic-transforming curve as to inputs in such a way that the changes become equal to one another; writing the table data in a green look-up table; measuring input signals for red and blue at intervals of the predetermined amount of light; and substituting the measured inputs with the table data of the shifted green standardized logarithmic-transforming curve at corresponding amounts of light.

7 Claims, 4 Drawing Sheets

OFFSET DRIFT CORRECTION METHOD IN COLOR FILM INSPECTION APPARATUS

BACKGROUND OF THE INVENTION

The present invention relates to an offset drift correction in a color film inspection apparatus.

A color film inspection apparatus is used to display a color image or images of a color original on a CRT screen based on which color prints to be finished are visually evaluated prior to photo-printing. Such a color film inspection apparatus is generally provided with the same automatic correction system for color density and color balance as is provided in automatic printing apparatus by which finished color prints are stimulated and displayed on a color monitor such as a color CRT. From a visual inspection of the color image displayed on the color CRT, color originals improper in color density, color balance, and/or sharpness are checked. In order to determine the correct amount of color density and color balance, each color original is displayed on the color CRT through color and density simulation. By using the color film inspection apparatus, a precise color film inspection may be performed even by unskilled inspectors, resulting in a high quality of color prints.

An offset drift may occur in such an inspection apparatus due to electric circuits dependent an temperature changes, light and time (its adjusting elements change with time). If in fact the offset drift occurs, the images displayed on the CRT screen through a simulation will change in color balance or density, resulting in improper inspections. For this reason, an offset drift correction is conducted in order to make color prints with a high image quality.

One such offset drift correction method is disclosed in, for example, Japanese Patent Unexamined Publication No. 61-138,942. The offset drift correction taught by the above-mentioned Japanese Patent Unexamined Publication is a method to shift logarthmic-transforming curves for three colors, namely red, green and blue, written in a look-up table memory along the X-axis (input).

In such an offset drift correction method, standardized logarithmic-transforming curves for red, green and blue are provided to effect an offset drift correction by color. However, this offset drift correction has a problem that an error in color balance occurs. For example, a white original (which appears as a black image on a color negative) is displayed as a different color (not white) image on a color CRT, so the white image on a color original cannot be faithfully reproduced as the same white image.

OBJECT OF THE INVENTION

It is therefore an object of the present invention to provide an offset drift correction in a color film inspection apparatus by which an offset drift can be well corrected without any error in color balance.

SUMMARY OF THE INVENTION

According to the present invention, the offset drift correction is performed by the steps of: measuring the changes of density signals corresponding to various amounts of light at intervals of a predetermined amount of light by using, for example, a green standardized logarithmic-transforming curve in which plotted along the the X-axis is an input signal and along Y-axis is a density signal; providing table data by shifting the green standardized logarithmic-transforming curve along the X-axis in such a way that the changes become equal to one another throughout the whole range of the various amounts of light and writing the table data in a look-up table data for green; measuring input signals for red and blue at intervals of the predetermined amount of light; and substituting the measured input signals for red and blue with the density signals at corresponding amounts of light and rewriting the substitutions in each look-up table of red, blue.

With the inventive method an offset drift correction is at first effected for a standardized color by shifting a logarithmic-transforming curve of the one color along the Y-axis which is representative of an amount of light and for the remaining colors by shifting the corrected logarithmic-transforming curve of the one color along the Y-axis according to amounts of offset drift of the remaining colors relative to the one color, table data for the three colors can coincide with one another when plotting the amount of light on the X-axis and density on the Y-axis. Therefore, color originals can be faithfully reproduced in color.

DETAILED DESCRIPTION OF THE INVENTION

Figure 1:
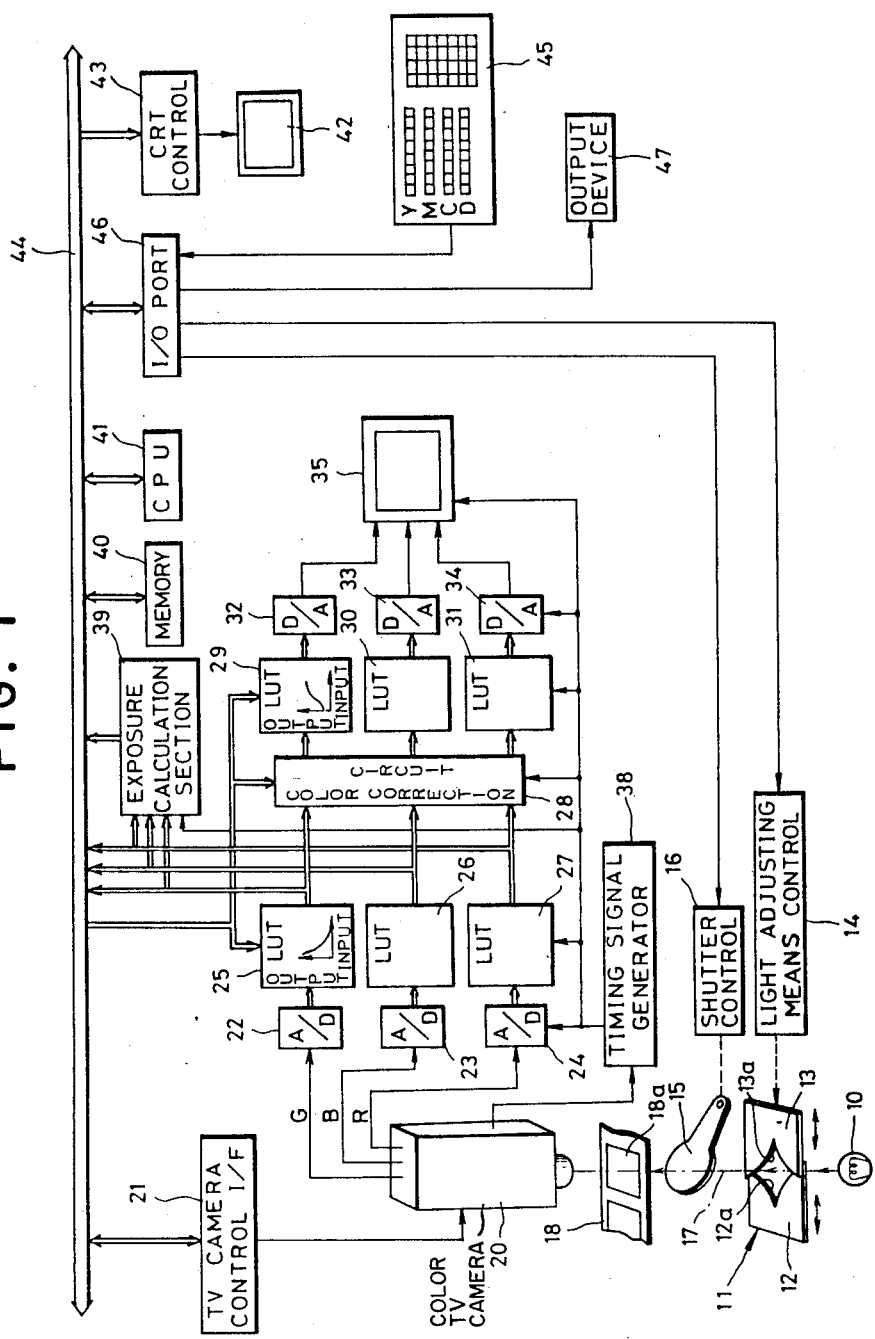
FIG. 1 is a schematic diagramatic illustration showing a color film inspection apparatus embodying the present invention.

Referring to FIG. 1 showing a color film inspection apparatus embodying the offset drift correction according to the present invention, the color film inspection apparatus includes a white light source 10 and a light adjusting means 11 by which the amount of light from the white light source 10 can be adjusted. The light adjusting means 11 has a pair of sliding plates 12 and 13 formed with cut-away portions 12a and 13a opposite to each other. The sliding plates 12 and 13 are movable symmetrically away from and close to each other. For these sliding plates 12 and 13, an ND filter or a light opaque plate is used. A pulse motor is used to move the respective sliding plates 12 and 13 to change the size of an opening defined by the cut-away portions 12a and 13a of the sliding plates 12 and 13, so as to stepwise the adjust amount of light passing through the opening.

Disposed above the light adjusting means 11 is a shutter 15 which is used to effect offset drift correction. This shutter 15 is controlled by a shutter control 16 to interrupt light passing through the light adjusting means 11 along a light path 17. A color film 18 is placed above the shutter 15 for being subjected to inspection. The color film 18 may take any of various typed of film, for example color negative films, color positive films, and the like. However, it is to be noted that if a color negative film is inspected, a negative-positive image conversion is to be performed. The description of this embodiment will be hereinafter directed to a color film inspection.

The color negative film 18 is illuminated frame-by-frame by light passed through the light adjusting means 11. The frame 18a under illumination is picked up by a color TV camera 20 having a color separation optical system and three image pick-up tubes well known to those skilled in the art. This color TV camera 20 is controlled by a CPU 41 through a camera control interface 21 to separate a picked up image into three monocolor images and to output three color video signals, namely green (G), blue (B), and red (R) video signals, which in turn are transmitted to A/D converters 22 to 24 provided for the respective colors to be subjected to digital conversion.

The digital video signals from the A/D converters 22 to 24 are transmitted to logarithmic-transforming look-up tables 25 to 27 for logarithmic transformation in order to provide color density signals. The color density signals are then subjected to color correction which is performed by using a 3-3 color correction matrix representation in a color correction circuit 28. This color correction is carried out for the purpose of correcting the difference of spectral sensitivity between the color TV camera 20 and a color photographic paper on which the images of the color negative film 18 are printed.

The color corrected density signals for the three colors then transmitted to look-up tables 29 to 31 for a negative-positive image conversion and a gradient correction according to a characteristic curve of the photographic paper. The color corrected and gradient corrected density signals for the three colors are transmitted to a color monitor 35 after a digitalanalog conversion by means of D/A converters 32 to 34. The color monitor 35, which is preferably a color CRT, displays a simulated image which is to be printed by an automatic printing apparatus. It is noted that frame memories may be provided for the three colors between the gradient conversion look-up tables 29 to 31 and the D/A converters 32 to 34.

Each circuit provided between the A/D converters 22 to 24 and the D/A converters 32 to 34 is actuated by a timing signal generated by a timing signal generator 38 in cooperation with a synchronizing signal provided by the color TV camera 20.

As is well known to those skilled in the art, an automatic photo-printing apparatus controls exposures for three colors by using, for example, large area transmittance densities (LATDs), maximum densities, minimum densities, or the like. To implement this automatic exposure control, the color film inspection apparatus is provided with an automatic exposure calculation section 39 to which the density signals are transmitted from the respective look-up tables 25 to 27. According to a calculated result, the light adjusting means 11 is controlled to adjust light by which the color film 18 is illuminated. Simultaneously, the calculated result is used to effect a data-shift in each logarithmic-transforming look-up table 29, 30, 31 so as to correct a density and color balance of each color signal in order to display a simulated image to be reproduced on the color photographic paper.

In a memory 40, there is stored an original logarithmic-transforming curve for green, which will be described in detail later, and a program for executing calculations and controls. For effecting various calculations and control of various operative elements based on a program, the CPU 41 which is well known per se is provided. A display device 42 is connected to a bus line 44 through a CRT controller 43 to display a command menu for running the apparatus and input data thereon.

A keyboard 45 has a color correction key arrangement, density correction key arrangement, alphabetical key arrangement, a power key, and the like. Particular data entered by manually operating the respective correction keys are transmitted to an output device 47 such as a paper tape perforator, a magnetic floppy drive, through an I/O port 46 so as to record the correction data on the paper tape or the magnetic floppy.

A color film inspection is started by writing necessary table data in the logarithmic-transforming look-up tables 25 to 27 and the gradient correction look-up tables 29 to 31. The color negative film 18 is placed to position a frame 18a to be inspected below the color TV camera 20. While the light adjusting means 11 is set to a normal condition, the color TV camera 20 is actuated to pick up an image of the frame 18a. The image is outputted as video signals for three colors, namely green, blue and red, from the color TV camera 20. Each color video signal is subjected to the processes, digital conversion, logarithmic transformation, color correction, negative-positive conversion, gradient correction, and analog conversion, in this order and then transmitted to the color monitor 35.

On the other hand, the density signals from the logarithmic-transforming look-up tables 25 to 27 are transmitted to the exposure calculation section 39 to calculate printing exposures by which the photo-printing apparatus controls an actual printing. The calculated exposure data is transmitted to the CPU 41 to control a light adjusting means controller 14 so as to move the sliding plates away from or close to each other in order to adjust the amount of light illuminating the color negative film 18. The image illuminated by the adjusted amount of light is picked up by the color TV camera 20 and displayed on the color monitor 35 after being subjected to the above described processes. As a result, a simulated image to be printed on the color photographic paper by the automatic photo-printing apparatus is displayed on the color monitor 35.

If in fact the displayed image is considered to be proper as a result of a visual inspection, a "no-correction" key on the keyboard 45 is operated. In this case, "no-correction" data is temporarily stored in the memory 40, while the color negative film 18 is transported to place a new frame to be inspected below the color TV camera 20.

Contrary to the above, if the displayed image is considered necessary to correct in color density, an appropriate density correction key is manually operated to enter density correction data. According to the entered color density correction data, the light adjusting means control 14 is so controlled as to move the sliding plates 12 and 13 away from or close to each other in order to adjust the amount of light by which the color negative film 18 is illuminated. As the result of a visual inspection of an image on the color monitor 35, if in fact the image is considered to be well corrected in color density, an inspection end key is operated to finish a color density inspection. Upon operating the inspection end key, a step number of the manually operated density correction key is temporarily stored in the memory 40, and the color negative film 18 is transported to place a new frame to be inspected below the color TV camera.

In the case that the image is considered to be improper in color balance, a color correction key is operated to cause the gradient correction look-up tables to shift the gradient correction curves along the X-axis and to rewrite the shifted curves therein. As a result, the color image on the color monitor 35 is changed in color balance. If the color balance changed color image on the color monitor 35 is considered to be well corrected in color balance, the inspection end key is manually operated to finish the color balance inspection. Upon operating the inspection key, a step number of the manually operated color correction key is temporarily stored in the memory 40. Then the color negative film 18 is transported in the same manner as described above.

After the inspection of all frames of the color negative film 18, a print key is operated to send the data stored in the memory 40 to the output device 47 and store it in a memory medium. When printing, the memory medium is mounted on the automatic photo-printing apparatus. The photo-printing apparatus controls exposures based on the correction data read out from the memory medium. As a result, the photo-printing apparatus print the same image as displayed on the inspection color monitor 35 on the color photographic paper. It is apparent that the color film inspection apparatus shown in FIG. 1 may be incorporated in the automatic photo-printing apparatus.

In the above described color film inspection apparatus, due to the associated electric circuits dependence on temperature changes, a light source and time (because the sources) associated adjusting means changes with time, an offset drift possibly occurs. The offset drift is corrected by rewriting the data in the logarithmic-transforming look-up tables 25 to 27 before the various image processing circuits.

Figure 2:
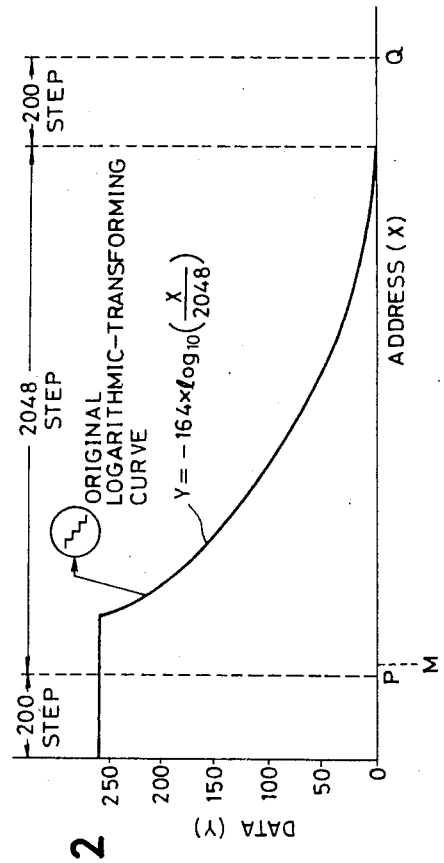
FIG. 2 is a graph showing an original logarithmic-transforming curve for green.

FIG. 2 shows the green original logarithmic-transforming curve which is stored in the memory 40 shown in FIG. 1. The curve is drawn for 2,448 steps of inputs (address) of which 200 steps on each side are assigned to effect an offset drift correction.

Figure 3:
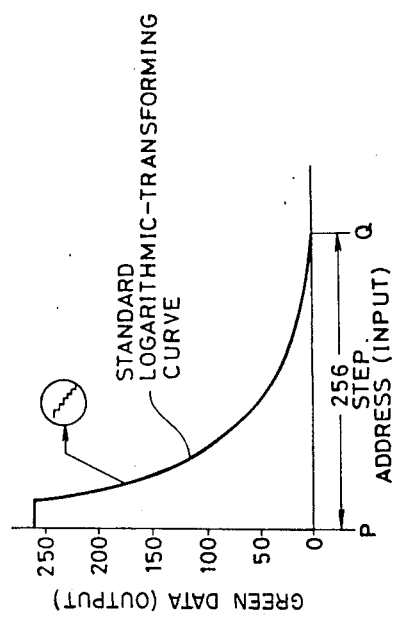
FIG. 3 is a standardized logarithmic-transforming curve for green.

FIG. 3 shows the green standardized logarithmic-transforming curve which is drawn for data (Y) of the green original logarithmic-transforming curve of FIG. 2 taken at every N steps, for example eight bits, starting from a standard point P in FIG. 2. That is, the green standardized logarithmic-transforming curve of FIG. 3, which is a curve resulting from a one-eighth zone-compression of the original logarithmic-transforming curve of FIG. 2, has 256 steps. This green standardized logarithmic-transforming curve is written first in the look-up table 25 for green.

Figure 4:
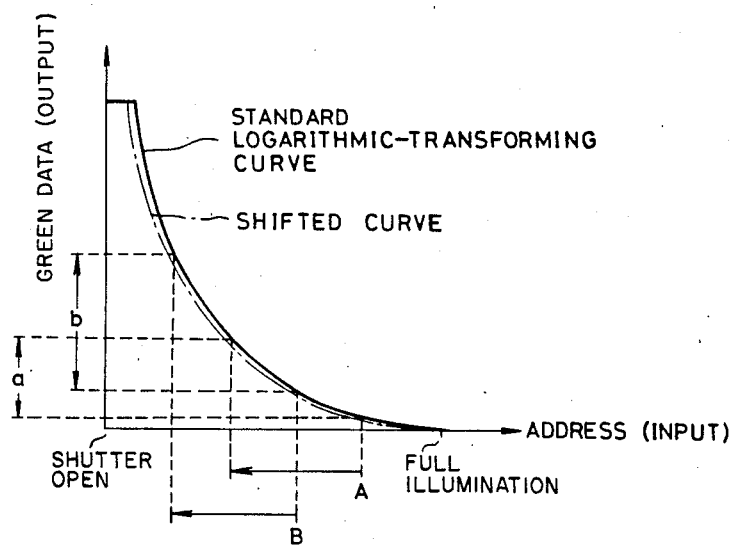
FIG. 4 is an explanatory graphical illustration showing shifting of the standardized logarithmic-transforming curve.

FIG. 4 is an explanatory diagram showing a way in which the green standardized logarithmic-transforming curve is shifted. When the offset drift correction is intended, the color negative film 18 is removed and the change of density with the change of the amount of light from the light source 10 is measured. According to the result of this measurement, the standardized logarithmic-transforming curve is shifted to make the change of density overall the range of the change of the amount of light. Practically, the light adjusting means 11 is controlled to diminish the amount of light by a predetermined amount from a relatively large amount shown at A to obtain the amount of density change a corresponding to the diminished amount of light and then, in the same way, by the same predetermined amount from a relatively small amount shown at B to obtain the amount of density change b corresponding to the diminished amount of light. The obtained density changes a and b are compared with each other.

If the amount of density change b is larger than the amount of density change a, the standardized logarithmic-transforming curve is to be shifted to the left hand side viewed in FIG. 4. In this case, a starting point of the standardized logarithmic-transforming curve is shifted by M steps, for example 8 steps, from an original point P shown in FIG. 2. With taking the shifted starting point at the leading address of the look-up table 25, data of the original logarithmic-transforming curve are sampled at every eight steps starting from the shifted starting point as is shown in FIG. 3 and written in the look-up table 25 with the data of the shifted starting point at the leading address thereof. Consequently, table data which is the curve shifted from the standardized logarithmic-transforming curve by eight steps is written in the look-up table 25. Using the shifted logarithmic-transforming curve, the density change is checked relative to the change of the amount of light from the light source 10. If it is further required to shift the standardized logarithmic-transforming curve, data of the amount of light at a point $(P+2\times8)$ is written in the look-up table 25 at the leading address and data at every eight steps are correspondingly written in the look-up table 25.

When density is measured while shifting the standardized logarithmic-transforming curve at intervals of eight steps, the difference between density changes will gradually decrease. If the density difference becomes too small, then data is written in the look-up table in the same way but from a new starting point which is conversely shifted, for example, one step from the previous starting point. Thereby, the standardized logarithmic-transforming curve is shifted by one step. In this way, the density change is checked while changing the standardized logarithmic-transforming curve step by step. When no difference of density change is detected, the shifting of the standardized logarithmic-transforming curve is terminated to finish the offset drift correction for green.

After the offset drift correction for green, offset drift corrections are effected for blue and red. For effecting these blue and red offset drift corrections, a linear line in which input equals to output is at first written in each look-up table 26 and 27. And outputs of the look-up tables 25, 26, and 27 are respectively measured corresponding to 256 consecutive steps of different amounts of light. At each measurement, by using the outputs from the look-up tables 26 and 27 for blue, red as addresses, data of the linear lines of the look-up tables 26 and 27 are substituted by the data on the offset drift corrected curve for green and rewritten in the look-up table 27 at corresponding addresses.

Figure 5:
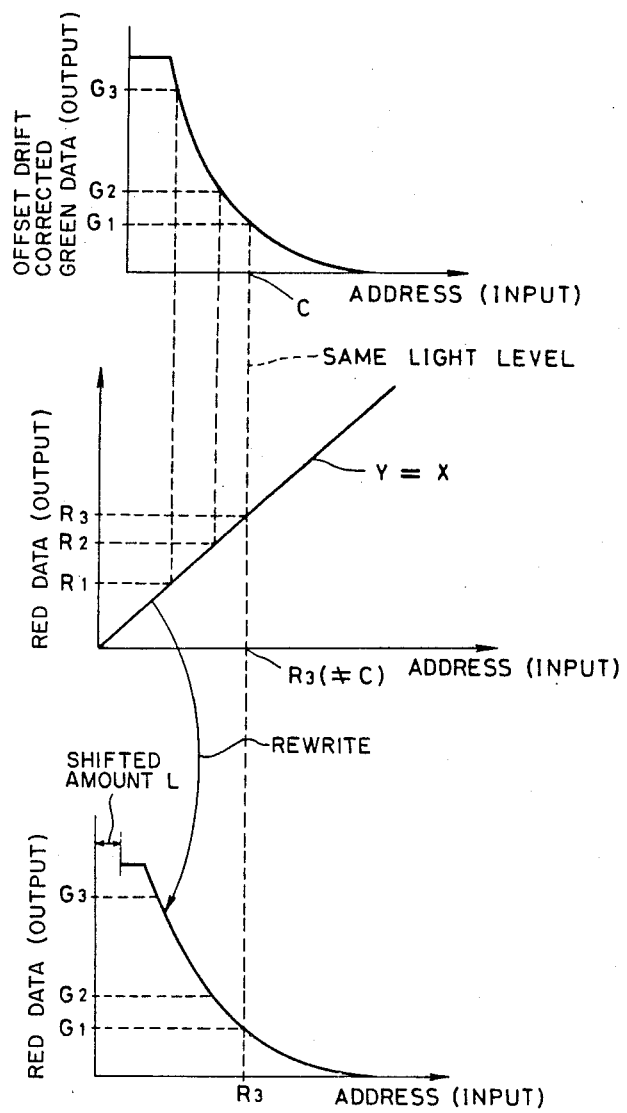
FIG. 5 is an explanatory graphical illustration showing rewriting table data for red in a look-up table.

Reference is now had to FIG. 5 for more detailed description of the offset drift correction for red. When regulating the light adjusting means to a certain condition, letting the output of the look-up table is R3 for red and G1 for green. In this case, the output data G3 is written in the look-up table 27 for red designating the output data R3 as address. At this time, although the input (address) of the look-up table 25 for green is represented by C, the input (address) of the look-up table 27 for red is R3 which is not always equal to the input C. In this embodiment, as the red data (output) is different from the green data (output), the red red logarithmic-transforming curve for red is drawn as shifted by the shifted amount of L from that for green.

This data rewriting for red is repeated 256 times in total at the intervals of one step from a condition at which the shutter 15 is placed in the optical path 17 to a condition at which the shutter is removed from the optical path and the light adjusting means is fully opened.

Figure 6:
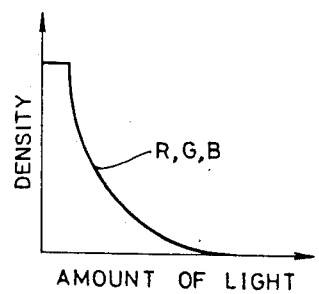
FIG. 6 is a graph showing the relationship between density and the amount of light by the use of the offset drift corrected look-up table.

FIG. 6 shows a relationship between light the amount of light and density after the completion of three color offset drift correction. As is understood from FIG. 6, since the curves for three colors are completely coincident, color balance does not change even though, for example, a density correction key is operated.

For adjusting the color film inspecting apparatus, in addition to the above described offset drift correction, a sensitivity correction should be conducted. For the purpose of sensitivity correction, each logarithmic-transforming curve is shifted as to Y-axis (output). Specifically, after having adjusted the light adjusting means 11 to pass an amount of light which gives a predetermined density, outputs are measured for each look-up table 25, 26, 27. The differences between the outputs (measured densities) and the predetermined density are added to the data having been subjected to offset drift correction and the resulting data are written in the respective look-up tables 25 to 27.

Although, in the above described embodiment, green color which is defined approximately in the middle wavelength range of visible light is used as the standard color and the offset drift corrected logarithmic-transforming curve for green is shifted along the X-axis according to the amount of offset drift for each remaining color so as to determine the offset drift corrected logarithmic-transforming curve, it is permissible to use red or blue as the standard color.

What is claimed is:

1. An offset drift correction method for use in a color film inspection apparatus, which apparatus displays video signals as a color image on a color monitor for visual inspection, said video signals being provided as respective input signals for red, green, and blue, said input signals being obtained by illuminating a color original with regulated light, detecting the color image, converting the detected color image into a digital form, transforming the digital color image into density signals using look-up tables provided for said respective colors, and converting the density signals into analog signals after a color and a gradient correction so as to be reproduced as said color image on said color monitor, said offset drift correction method comprising the steps of:

measuring the changes of said density signals with respect to various amounts of light at intervals of a predetermined amount of light by using a standardized logarithmic-transforming curve for green in which along the X-axis is an input signal and along the Y-axis is a density signal;

providing table data by shifting said standardized logarithmic-transforming curve for green along the X-axis in such a way that said changes become equal to one another throughout the whole range of said various amounts of light;

writing said table data in said look-up table for green;

measuring input signals for red and blue at intervals of said predetermined amount of light;

substituting said measured input signals for red and blue by said table data of said shifted green standardized logarithmic-transforming curve at corresponding amounts of light; and writing said substitutions in said look-up tables for red and blue, respectively.

2. An offset drift correction method as defined in claim 1, wherein said green standardized logarithmic-transforming curve is comprised by table data of density sampled from an original logarithmic-transforming curve at intervals of N steps starting at a point of a Pth step, said green standardized logarithmic-transforming curve being drawn for a number of steps of inputs considerably greater than N.

3. An offset drift correction method as defined in claim 2, wherein said measurement of said changes of said density signals is effected for relatively small input signals and relatively large input signals, and if said changes of said density signals are different, said sampling of said table data from said original green logarithmic-transforming curve is started at a point of a (P+nm)th step wherein n is the number of data writing.

4. An offset drift correction method as defined in claim 3, wherein said M is equal to N when said difference of said change of said density signals is large.

5. An offset drift correction method as defined in claim 4, wherein said N is 8.

6. An offset drift correction method as defined in claim 5, wherein said point at which said sampling is started is shifted by one step from a previous sampling when said difference of said change of said density signals is small.

7. An offset drift correction method as defined in claim 6, wherein in said look-up table memory for each of red and blue a linear table data is written for drawing a table data curve in which along the X-axis are said density signals of each of red and blue and along the Y-axis are said density signals for green.

* * * * *